… … … …

United States Patent Office 3,738,953
Patented June 12, 1973

3,738,953
SYNERGISTIC FIRE RETARDANT FOAMS
Carlos J. Anorga, Carson, Samuel Chess, Palos Verdes Estates, and Theodore B. Lefferdink, Carson, Calif., assignors to The Upjohn Company, Kalamazoo, Mich.
No Drawing. Filed Dec. 6, 1971, Ser. No. 205,380
Int. Cl. C08g 22/44
U.S. Cl. 260—2.5 AJ                                    12 Claims

ABSTRACT OF THE DISCLOSURE

Flexible polyurethane foams are described which have outstanding flame retardant properties. The foams are the product of reaction, under foam producing conditions, of a combination of (a) a mixture of toluene diisocyanate and polymethylene polyphenyl isocyanate; (b) a polyether polyol; (c) antimony oxide; (d) a polyhalogenated aromatic compound or a polybrominated diol; and (e) a highly chlorinated hydrocarbon polymer. The foams meet the very stringent tests for fire retardance required of seat cushioning, mattresses, and like materials in aircraft, institutions such as hospitals, convalescent homes and the like.

BACKGROUND OF THE INVENTION

(1) Field of the invention

This invention relates to cellular polyurethanes and is more particularly concerned with flame retardant flexible polyurethane foams and with processes for their preparation.

(2) Description of the prior art

The use of antimony oxide, alone or in combination with other additives, to impart fire retardance to flexible polyurethane foams is well-known. Illustratively, British specification 1,079,984 shows the use of a combination of antimony oxide and hexahalobenzenes in the preparation of fire retardant flexible foams. U.S. Pat. 3,075,927 shows a combination of antimony oxide and a vinyl halide as fire retardants in foams prepared from aromatic polyethers. U.S. Pats. 3,075,928 and 3,222,305 show the same combination in foams prepared from aliphatic polyethers and from polyamines, respectively.

U.S. Pat. 3,574,149 describes a combination of antimony oxide, zinc oxide made by the "French process," and a chlorinated polymer in polyether-based flexible foams. The zinc oxide is said to exert a synergistic effect in the combination.

We have now found that, by use of antimony oxide in combination with other additives in a particular combination of foam reactants, it is possible to increase the flame retardance of flexible foams to such an extent that said foams will meet the very stringent tests required for use of flexible foam as cushioning in public institutions and like circumstances.

SUMMARY OF THE INVENTION

This invention comprises flame retardant flexible polyurethane foams which comprise the product of reaction of:

(a) A polyisocyanate mixture which contains from 5 percent to 95 percent by weight of toluene diisocyanate, and from 95 percent to 5 percent by weight of polymethylene polyphenyl polyisocyanate containing from about 40 percent to about 70 percent of methylenebis(phenyl isocyanate), the remainder of said polymethylene polyphenyl polyisocyanates having functionality higher than 2.0;

(b) A polyether polyol having an equivalent weight from about 500 to about 2500 and a functionality from about 2 to about 4;

(c) A blowing agent;

(d) A catalyst;

(e) From about 2 to about 20 percent by wenght, based on weight of final foam, of antimony oxide;

(f) From about 1 to about 15 percent by weight, based on weight of final foam, of a member selected from the class consisting of polyhalogenated aromatic compound and polybrominated aliphatic diols; and (g) A chlorinated hydrocarbon polymer in an amount such that the resultant foam contains from about 2 to about 8 percent by weight of chlorine.

The invention also comprises processes for the preparation of the above foams.

DETAILED DESCRIPTION OF THE INVENTION

The flexible polyurethane foams of the invention are prepared using techniques well-recognized in the art (see, for example, Saunders et al. Polyurethanes: Chemistry and Technology, Part II, pages 1–191, Interscience Publishers, New York, 1964). However, criticality resides in the particular combination of reactants employed in accordance with the invention. The term "flexible polyurethane foam" as used herein has the meaning normally attributed to this term; see Saunders et al. ibid, page 117. Thus, said term is used to describe a class of polyurethane foams characterized by a high ratio (i.e. greater than unity and generally from about 15:1 to 70:1) of tensile strength to compressive strength (at 25 percent deflection) as determined by ASTM D 1564–62T, high elongation, high rate of recovery from distortion (rebound) and high elastic limit. These characteristics distinguish a "flexible" from a "rigid" polyurethane foam, the latter being characterized by a combination of a high ratio of compressive to tensile strength, low elongation, low rate of recovery from distortion and a low elastic limit.

Within the broad classification of flexible foams as defined above is a group of foams commonly referred to as "semi-flexible." Semi-flexible foams possess the distinguishing properties described above for the generic class of flexible foams and, in addition, are characterized by a high order of compressive strength (the ratio of tensile to compressive strength at 25 percent deflection remaining greater than unity), a density of the order of about 1.0 to about 30.0 lbs. per cu. ft. and a lower rate of rebound. The semi-flexible foams are frequently described as "energy-absorbing" foams and find their chief use in packaging, crash pad formulation, and the like, wherein the foam is employed to cushion the effect of the impact between solid bodies in different states of motion.

The polyisocyanates which are employed in preparing the fire retardant polyurethane foams of the invention are particular mixtures, the use of which is a factor in obtaining the desired flame retardancy in the foams of the invention. The mixture of polyisocyanates in question is comprised of (1) from 5 percent to 95 percent by weight of toluene diisocyanate and (2) from 95 percent to 5 percent by weight of polymethylene polyphenyl polyisocyanates containing from about 40 percent to about 70 percent by weight of methylenebis(phenyl isocyanate). The toluene diisocyanate employed in the above mixtures can be present as 2,4-isomer or the 2,6-isomer or mixtures thereof such as the mixtures containing 80 percent by weight of the 2,4-isomer and 20 percent of the 2,6-isomer, and those containing 65 percent by weight of the former and 35 percent of the latter, both of which are commonly available commercially.

The polymethylene polyphenyl isocyanates set forth above are well-known in the art and can be prepared in accordance with conventional techniques by phosgenation of the corresponding mixtures of methylene-bridged polyphenyl polyamines. The latter are obtained by condensation of aniline and formaldehyde in the presence of aqueous mineral acid, usually hydrochloric acid, by procedures known in the art; see, for example, Canadian Pat. 700,026; U.S. Pats. 2,950,263 and 3,012,008; and German specification 1,131,877. As is well known in the art, the desired proportion of methylenebis(phenyl isocyanate) in the polymethylene polyphenyl isocyanate is attained by controlling the proportion of methylene dianilines in the intermediate polyamine, and the latter proportion is, in turn, controlled by adjusting the ratio of aniline to formaldehyde in the initial condensation of these components.

A particularly preferred combination of polyisocyanates for use in preparing flexible foams in accordance with the invention is a mixture containing approximately 65 to 75 percent by weight of toluene diisocyanate, the remainder of said mixture being polymethylene polyphenyl polyisocyanate containing approximately 50 percent by weight of methylenebis(phenyl isocyanate).

The polyols which are employed in making the flexible foams of the invention are polyether polyols having an equivalent weight of about 500 to about 2500 and a functionality of about 2 to about 4. Preferably the polyether polyols employed in preparing the flexible foams of the invention are triols having an equivalent weight of about 1600 to about 2300.

The above types of polyether polyols are well known in the art as are the methods for their preparation. Said polyether polyols include polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene oxypropylene glycols prepared in a similar manner utilizing a mixture of ethylene oxide or propylene oxide or a sequential addition of ethylene oxide and 1,2-propylene oxide; polyether glycols prepared by reacting ethylene oxide, propylene oxide or mixtures thereof with mono- and polynuclear dihydroxybenzenes, e.g. catechol, resorcinol, hydroquinone, orcinol, 2,2-bis(p-hydroxyphenyl)propane, bis(p-hydroxyphenyl) methane, and the like; and polyethers prepared by reacting ethylene oxide, propylene oxide, or mixtures thereof with aliphatic polyols such as glycerol, sorbitol, trimethylolpropane, 1,2,6-hexanetriol, pentaerythritol and the like.

In order to produce those flexible foams of the invention which are classified as semi-flexible as discussed hereinabove, it is necessary to include in the polyol component a low molecular weight polyol having a functionality of 3 or higher, preferably from 3 to 6, and a molecular weight from about 290 to about 800 in order to increase the degree of cross-linking and thereby, in part, increase the load bearing capacity and lower the elongation of the resulting foam. The proportion of cross-linking agent introduced into the polyol component for this purpose varies according to the properties desired in the resulting foam. Generally speaking, the amount of cross-linking agent employed can vary from about 5 percent to about 30 percent by weight of the total polyol employed. Examples of cros-linking polyols having a functionality of 3 to 6 are pentaerythritol, hydroxyalkylated aliphatic diamines such as N,N,N',N'-tetrakis(2-hydroxypropyl)ethylene diamine, N,N,N',N'-tetrakis(2-hydroxyethyl)ethylene diamine, and the like, and low molecular weight (within the above cited range) alkylene oxide adducts of glycerol, trimethylolpropane, hexane-1,2,3-triol, sucrose, sorbitol, methyl glucoside, and the like.

Said cross-linking polyols can be admixed with the other polyol or mixture of polyols prior to formation of the polyurethane or can be fed into the foam mix as a separate stream during the mixing stage of a one-shot procedure.

The antimony oxide is employed in making the fire retardant foams of the invention in amounts such that the resulting foam will contain from about 2 to about 20 percent by weight. Preferably, the amount of antimony oxide employed is such that the resulting foam contains from about 5 to about 10 percent by weight. The antimony oxide is generally introduced into the foam mix in the form of a finely divided powder which, advantageously, is dispersed in the polyol component prior to the addition of the latter to the foam reaction mix.

The "polyhalogenated aromatic compound" employed in preparing the fire retardant flexible foams of the invention is inclusive of polyhalogenated aromatic diamines such as 3,3'-dichlorobenzidine, 2,3,2',3'-tetrachlorobenzidine, 3,3'-dibromobenzidine, methylenebis(2-chloroaniline), methylenebis(2,3-dichloroaniline), methylenebis(2,6-dichloroaniline), and the like, polyhalogenated benzenes such as tetrachlorobenzene, hexachlorobenzene, tetrabromobenzene, hexabromobenzene, and the like, polyhalogenated bisphenol-A such as tetrachloro- and tetrabromo - bisphenol-A, dichlorodibromo - bisphenol-A, and the like. The preferred polyhalogenated aromatic compounds are polybrominated hydrocarbons which are insoluble in water, have a melting point above about 50° C. and contain at least about 60 percent by weight of bromine. The most preferred polyhalogenated aromatic compound is hexachlorobenzene.

The "polybrominated aliphatic diols" are inclusive of 2,3 - dibromo-2-butene-1,4-diol, 2,2-dibromopropane-1,3-diol, dibromoneopentyl glycol[2,2-bis(bromomethyl)-1,3-propanediol], 2,3-dichloro-1,4-butanediol, 2,3-dibromo-1,4-butanediol, and the like.

The polyhalogenated aromatic compound or diol is employed in making the fire retardant foams of the invention in amounts such that the resulting foam will contain from about 1 to about 15 percent by weight thereof. Preferably, the amount of polyhalogenated compound employed is such that the resulting foam contains from about 2 to about 7 percent by weight. The polyhalogenated compound is generally introduced into the foam mix in the same manner as the antimony oxide, namely, as a dispersion in the polyol component.

The chlorine-containing hydrocarbon polymers which are employed in the preparation of the polymer foams of the invention can be any of those known in the art. Illustrative of such polymers are polychloroprene (neoprene), chlorinated natural rubber, polyvinyl chloride, poly(vinylidene chloride), including chlorinated derivatives of the latter, as well as copolymers of vinyl chloride with other vinyl monomers such as vinyl acetate, methyl acrylate, methyl methacrylate, acrylonitrile, vinylidene chloride, and the like. Advantageously, the chlorinated hydrocarbon polymers contain at least about 50 percent by weight of chlorine and, preferably, at least about 65 percent by weight of chlorine. The preferred chlorinated hydrocarbon polymers are polyvinyl chloride, polyvinylidene chloride and more highly chlorinated derivatives thereof.

The chlorine-containing hydrocarbon polymers are advantageously introduced into the foam reaction mixture by preblending the polymer, in comminuted form, with one of the other reaction components preferably the polyol. The amount of chlorine-containing hydrocarbon polymer employed in making the flexible polyurethane foams of the invention is such that the resultant foam has a chlorine content of from about 2 to about 8 percent by weight. Preferably, the amount of chlorine-containing hydrocarbon is such that the resulting foam has a chlorine content of from about 4 to about 7 percent by weight.

The proportion of equivalents of polyisocyanate to equivalents of active hydrogen-containing material employed in making the flexible polyurethane foams of the invention is generally within normal limits, i.e. from about 1.0:1.0 to about 1.3:1.0. Preferably, the proportion is about 1.0:1.0.

Any of the catalysts conventionally employed in the art to catalyze the reaction of a polyol and an isocyanate can be employed as catalyst in the preparation of the flexible foams of this invention. Such catalysts are described, for example, by Saunders et al. ibid, Part I, pp. 228-232, and by Britain et al., J. Applied Polymer Science, 4, pp. 207-211, 1960. Such catalysts include organic and inorganic salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative organotin catalysts are stannous octoate, stannous oleate, dibutyltin dioctoate, dibutyltin laurate, and the like. Representative tertiary organic amine catalysts are triethylamine,
triethylenediamine,
N,N,N',N'-tetramethylethylenediamine,
N,N,N',N'-tetraethylethylenediamine,
N-methylmorpholine,
N-ethylmorpholine,
N,N,N',N'-tetramethylguanidine,
N,N,N',N'-tetramethyl-1,3-butanediamine,
N,N-dimethylethanolamine,
N,N-diethylethanolamine, and the like. The preferred catalysts for use in the process of the invention are a combination of dibutyltin dilaurate and a tertiary amine selected from N,N,N',N'-tetramethyl-1,3-butane diamine and triethylenediamine. The amount of catalysts employed is generally within the range of about 0.1 to about 2 percent by weght based on the total weight of reactants.

The blowing agents which can be employed in the process of the invention are those conventionally employed in the preparation of flexible polyurethane foams. Illustrative of said blowing agents are water (which generates carbon dioxide by reaction with isocyanate) and volatile solvents such as the lower molecular weight aliphatic hydrocarbons and highly halogenated lower-aliphatic hydrocarbons, for example, trichloromonofluoromethane, dichlorodifluoromethane, chlorotrifluoromethane, 1,1-dichloro - 1 - fluoroethane, 1-chloro-1,1-difluoro-2,2-dichloroethane, and 1,1,1-trifluoro-2-chloro-2-fluorobutane, and the like. If desired, a mixture of water and one or more of said volatile solvents can be used as blowing agent. The final foam density of the flexible foams produced by the process of the invention is a function of the amount of blowing agent used. In general the higher the amount of blowing agent, the lower the density of the foam. Illustratively when water is used as the sole blowing agent, the amount of water required to produce a low density foam for use, for example, as a sponge type material is generally of the order of about 1.5 to about 5.0 parts per hundred parts of total polyol. When a semiflexible foam of higher density is required, the amount of water employed as sole blowing agent is of the order of about 0.5 to about 1.5 parts per hundred parts of total polyol.

In the preferred mode of preparation of the flexible foams of the invention, namely the one-shot procedure, the mixing of the polyol, polyisocyanate mixture, catalyst and gas forming agent is accomplished by high speed stirring or by injecting the reactants in separate streams simultaneously into a mixing area under conditions of rapid and efficient mixing which can be supplied by high turbulence or high shearing or stirring action. The number of streams can be reduced by combining those constituents of said mixture which do not enter into chemical reaction upon admixture. A common method of operation employs one stream containing the polyol components and any volatile solvent blowing agent, a second stream comprising the polyisocyanate mixture, a third stream containing water, surface active agent (if used) and catalyst.

If desired, a prepolymer technique can be employed in place of the "one-shot" procedure described above. In the prepolymer technique the polyisocyanate mixture is reacted in a preliminary step with a portion of the polyol (up to about 0.5 equivalents of polyol per equivalent of isocyanate) and the isocyanate-terminated prepolymer is used in the reaction with the remainder of the foam components using the techniques described above.

Optional additives such as dispersing agents, cell stabilizers, surfactants, flame retardants, and the like which are commonly employed in the fabrication of flexible polyurethane foams, can be employed in the process of the invention. Thus, a finer cell structure can be obtained if water-soluble organosilicone polymers are used as surfactants. Organosilicone polymers obtained by condensing a polyalkoxy polysilane with the monoether of a polyalkylene ether glycol in the presence of an acid catalyst are representative of those surfactants which can be used for this purpose. Other surfactants such as ethylene oxide modified polypropylene ether glycols can be used, if desired, to obtain better dispersion of the components of the foam mixture.

Other additives such as dyes, pigments, soaps and metallic powders and other inert fillers can be added to the foam mixture to obtain special foam properties in accordance with practices well-known in the art.

The flexible polyurethane foams produced by the process of the invention are high quality foams useful for a variety of purposes in which fire retardant flexible foams are required. The foams of the invention are particularly useful for cushioning and for mattresses to be used in locations in which strict compliance with fire safety codes is required. In particular, the flexible foams of the invention are found to pass the very stringent test known as the "hot bolt" test which was devised specifically to determine behavior of the above materials on exposure to burning objects such as cigarette butts and the like; see Mil R–20092F [Military Specification Mil R–20092F (July 20, 1970) fire resistance requirement 3.5.10, fire resistance test 4.4.9 (hot bolt)]. In this test a steel bolt preheated to 800° C. is dropped onto a foam block of predetermined thickness. The bolt passes through the foam very rapidly and the extent to which the foam burns, or does not burn, after this sudden exposure to an intensely hot object is a clear measure of the flame retardancy, or lack of it, in the foam. To pass the test requires that the foam be self-extinguishing within 10 seconds of the initial exposure to the hot bolt.

It is to be noted that the specific combination of foam reactants and fire retardant additives described herein represents the first such combination which has been found to pass this test. Further, each and every one of the limitations on nature and proportion of reactants and additives set forth herein has to be observed in order to obtain this result. Elimination of or change in any one of the additives or reactants, or reduction of the proportion of any of the additives below the level indicated herein is fatal to the desired level of flame retardancy.

Illustratively, the use of antimony oxide and hexabromobenzene without chlorinated hydrocarbon did not give the desired flame retardancy required to pass the above test even when the level of these components was raised to an extent such that the desirable physical properties of the foam were seriously affected.

Surprisingly, the use of the antimony oxide, hexabromobenzene and chlorinated hydrocarbon in the proportions set forth herein not only gave the desired flame retardancy necessary to pass the above test but did not materially affect the desirable physical properties of the resulting foams.

The following examples describe the manner and process of making and using the invention and set forth the best mode contemplated by the inventors of carrying out the invention but are not to be construed as limiting.

EXAMPLE 1

A flexible flame retardant polyurethane foam of the invention was prepared by high speed mixing of the following ingredients (all parts by weight):

34.9 parts of a mixture of 30 percent by weight of toluene diisocyanate (65/35) and 70 percent by weight of polymethylene polyphenyl isocyanate [eq. wt.=135; contains approximately 50 percent methylenebis(phenyl isocyanate];
100 parts of a mixture of:
69.2 parts poly(oxyethylene oxypropylene)triol, containing 50 percent primary OH (SF–6500; eq. wt.=2200)
7.4 parts of the adduct of 1 mole of trimethylolpropane and 3 moles of ethylene oxide (eq. wt.=93),
2.0 parts of chlorinated aromatic diamine (liquid blend of methylenebis(o-chloroaniline)) [LD 813],
7.2 parts of antimony trioxide,
10.6 parts of polyvinylchloride (QYKV),
3.6 parts of hexabromobenzene.

(The latter three components were employed in the form of powders which were dispersed by high speed stirring in a blend of the other components.)

1.75 parts of water;
0.7 part of triethylenediamine (33 percent solution in dipropylene glycol);
0.1 part of stannous octoate.

The foam was dispensed into a paper cup mold and allowed to rise freely. After curing for 72 hours at room temperature (circa 25° C.) the foam was subjected to physical testing and was found to have the following properties:

TABLE I

| Property | |
|---|---|
| Density, p.c.f. | 2.96 |
| Indentation load deflection | |
| 25% | 33.0 |
| 65% | 91.0 |
| Compression set at 90% percent | 2.0 |
| Tensile strength, p.s.i. | 15.1 |
| Tear strength, p.l.i. | 0.94 |
| Elongation, percent | 79.0 |
| Firse resistance—MIL–R–20092F, 4.4.5 (test run on mattress thickness) | |
| Burn time, seconds | 3.0 |
| Smoking & smolding time, minutes | 4.0 |
| Volume consumed, cu. in. | 16.2 |
| Static fatigue resistance—MIL–R–20092F, 4.4.10 | No cracking |
| Flexing, Method 12111 of Fed. Std. 601, percent set | 1.7 |

EXAMPLE 2

A flexible flame retardant polyurethane foam of the invention was prepared using the ingredients and proportions set forth in Example 1 but replacing the polyisocyanate mixture there used by the following:

62.9 parts of a prepolymer obtained by reacting 50 parts poly(oxyethylene oxypropylene)triol [SF–6500] and 100 parts of a mixture containing 70 parts of toluene diisocyanate (65/35) and 30 parts of polymethylene polyphenyl polyisocyanate [eq. wt. 133; contains approximately 50 percent of methylenebis(phenyl isocyanate)].

The resulting foam was allowed to cure at room temperature (circa 25° C.) for 72 hours.

EXAMPLE 3

Using the procedure described in Example 1, a fire retardant flexible foam of the invention was prepared from the following ingredients (all parts by weight).

68.0 parts of a prepolymer obtained by reacting at 100° C. for 1 hour 26.7 percent by weight of toluene diisocyanate (80/20), 40.0 percent of polymethylene polyphenyl isocyanate (eq. wt. 135), and 33.3 percent by weight of poly(oxyethylene-oxypropylene)triol (eq. wt.=2200);
75.0 parts of polyoxypropylene (glycerol capped) (CP4701) eq. wt.=1670;
8.0 parts of antimony trioxide;
9.0 parts of polyvinyl chloride (QYKV);
3.0 parts of hexabromobenzene;
5.0 parts of polyoxypropylene (eq. wt.=118) (LA–475);
2.25 parts of water;
0.4 parts of diethylaminopropylamine;
0.5 parts of triethylene diamine (33.0 percent solution in dipropylene glycol);
0.4 parts of triethylamine; and
2.3 parts of trichlorofluoromethane;

The resulting foam was allowed to cure for 3 days at room temperature (circa 25° C.) and then submitted to physical testing with the following results.

| Property | |
|---|---|
| Density, p.c.f. | 3.27 |
| Indentation load deflection | |
| 25% | 34.0 |
| 65% | 107.0 |
| Compression set at 90% percent | 9.3 |
| Tensile strength, p.s.i. | 15.8 |
| Tear strength, p.l.i. | 0.9 |
| Elongation, percent | 60.0 |
| Fire resistance-MIL-R-20092F, 4.4.5 (test run on mattress thickness) | |
| Burn time, seconds | 3.0 |
| Smoking & smolding time, minutes | 3.0 |
| Volume consumed, cu. in. | 13.2 |
| Static fatigue resistance-MIL-R-20092F, 4.4.10 | No cracking |
| Flexing, Method 12111 of Fed. Std. 601, percent set | 1.7 |

EXAMPLE 4

A fire retardant flexible foam of the invention was prepared from the following ingredients (all parts by weight) using the procedure described in Example 1.

32.8 parts of a mixture of 30 percent by weight of toluene diisocyanate (65/35) and 70 percent by weight of polymethylene polyphenyl isocyanate [eq. wt.=135); contains approximately 50 percent methylenebis(phenyl isocyanate)]
74.7 parts poly(oxyethylene - oxypropylene)-triol (eq. wt.=2200);
7.5 dibromoneopentyl glycol;
7.2 antimony trioxide;
10.6 parts of polyvinyl chloride (QYKV); [The latter two components were employed in the form of powders which were dispersed by high speed stirring in a blend of the other polyol components.]
1.75 parts of water;
0.90 part of triethylene diamine (33 percent solution in dipropylene glycol).

The resulting foam was allowed to cure for 3 days at room temperature (circa 25° C.) and then submitted to physical testing with the following results.

Property

| | |
|---|---|
| Density, p.c.f. | 3.0 |
| Indentation load deflection: | |
| 25% | 30.0 |
| 65% | 86.0 |
| Compression set at 90 percent | 7.0 |
| Tensile strength, p.s.i. | 15.0 |
| Tear strength, p.l.i. | 1.1 |
| Elongation, percent | 85.0 |
| Fire resistance-MIL-R-20092F, 4.4.5 (test run on mattress thickness) | |
| Burn time, seconds | 3.0 |
| Smoking & smolding time, minutes | 5.0 |
| Volume consumed, cu. in. | 17.0 |
| Static Fatigue Resistance-MIL-R-20092F, 4.4.10 | No cracking |
| Flexing, Method 12111 of Fed. Std. 601, percent set | 1.8 |

EXAMPLE 5

Using the procedure described in Example 1, a fire retardant flexible foam of the invention was prepared from the following ingredients (all parts by weight).

34.9 parts of a mixture of 30 percent by weight of toluene diisocyanate (65/35) and 70 percent by weight of polymethylene polyphenyl isocyanate [(eq. wt.=135) contains approximately 50 percent methylenebis(phenyl isocyanate)];

69.2 parts poly(oxyethylene-oxypropylene)-triol (Niax 1127) eq. wt.=2200;

7.4 parts of the adduct of 1 mole of trimethylolpropane and 3 moles of ethylene oxide (eq. wt.=93);

2.0 parts of chlorinated aromatic diamine (LD 813, see Example 1);

7.2 parts of antimony trioxide;

10.6 parts of copolymer of vinyl chloride and vinylidene chloride (Geon 222);

1.75 parts of water; and 0.7 part of triethylene diamine (33 percent solution in dipropylene glycol).

The resulting foam was allowed to cure for 3 days at room temperature (circa 25° C.) and then submitted to physical testing with the following results.

Property

| | |
|---|---|
| Density, p.c.f. | 3.0 |
| Indentation load deflection | |
| 25% | 34.0 |
| 65% | 92.0 |
| Compression set at 90% percent | 6.9 |
| Tensile strength, p.s.i. | 14.9 |
| Tear strength, p.l.i. | 0.8 |
| Elongation, percent | 80.0 |
| Fire resistance—MIL-R-20092F, 4.4.5 (test run on mattress thickness) | |
| Burn time, seconds | 2.0 |
| Smoking and smoldering time, minutes | 4.0 |
| Volume consumed, cu. in. | 15.6 |
| Static Fatigue Resistance — MIL-R-20092F, 4.4.10 | No cracking |
| Flexing, Method 12111 of Fed. Std. 601, percent set | 1.9 |

What is claimed is:

1. A flame retardant flexible polyurethane foam which comprises the product of reaction of:
   (a) a polyisocyanate mixture which contains from 5 percent to 95 percent by weight of toluene diisocyanate, and from 95 percent to 5 percent by weight of polymethylene polyphenyl polyisocyanate containing from about 40 percent to about 70 percent of methylenebis(phenyl isocyanate), the remainder of said polymethylene polyphenyl polyisocyanates having functionality higher than 2.0;
   (b) a polyether polyol having an equivalent weight from about 500 to about 2500 and a functionality from about 2.0 to about 4.0;
   (c) a blowing agent;
   (d) a catalyst;
   (e) from about 2 to about 20 percent by weight, based on weight of final foam, of antimony oxide;
   (f) from about 1 to about 15 percent by weight, based on weight of final foam, of a polyhalogenated member selected from the class consisting of polyhalogenated aliphatic diols and polyhalogenated aromatic compounds; and
   (g) a chlorinated hydrocarbon polymer in an amount such that the resultant foam contains from about 2 to about 8 percent by weight of chlorine.

2. A flame retardant flexible foam according to claim 1 in which the polyisocyanate mixture contains (a) approximately 70 percent by weight of toluene diisocyanate and (b) 30 percent by weight of polymethylene polyphenyl polyisocyanate in which the content of methylenebis(phenyl isocyanate) is about 50 percent by weight.

3. A flame retardant flexible foam according to claim 1 in which the polyether polyol is a triol having an equivalent weight from about 1600 to about 2300.

4. A flame retardant flexible foam according to claim 1 in which the polyhalogenated member is a polybrominated aromatic compound which is insoluble in water, has a melting point above 50° C. and contains at least about 60 percent by weight of bromine.

5. A flame retardant flexible foam according to claim 4 wherein the polybrominated compound is hexabromobenzene.

6. A flame retardant flexible foam according to claim 1 wherein the halogenated hydrocarbon is polyvinyl chloride.

7. A flame retardant flexible polyurethane foam which comprises the product of reaction of:
   (a) a polyisocyanate mixture which contains from 5 percent to 95 percent by weight of toluene diisocyanate, and from 95 percent to 5 percent by weight of polymethylene polyphenyl polyisocyanate containing about 50 percent of methylenebis(phenyl isocyanate), the remainder of said polymethylene polyphenyl polyisocyanates having functionality higher than 2.0;
   (b) a polyether triol having an equivalent weight of about 1600 to about 2300;
   (c) a blowing agent;
   (d) a catalyst;
   (e) from about 5 to about 10 percent by weight, based on weight of final foam, of antimony oxide;
   (f) from about 2 to about 7 percent by weight, based on weight of final foam, of a polyhalogenated member selected from the class consisting of polyhalogenated aliphatic diols and polyhalogenated aromatic compounds; and
   (g) a chlorinated hydrocarbon polymer in an amount such that the resultant foam contains from about 4 to about 7 percent by weight of chlorine.

8. A flame retardant flexible polyurethane foam according to claim 7 in which the polyhalogenated member is hexabromobenzene.

9. A flame retardant flexible polyurethane foam according to claim 7 in which the polyhalogenated member is dibromoneopentyl glycol.

10. A flame retardant flexible polyurethane foam according to claim 7 in which the polyhalogenated member is a polychloro aromatic diamine.

11. A flame retardant flexible polyurethane foam according to claim 7 in which the chlorinated hydrocarbon polymer is polyvinyl chloride.

12. A flame retardant flexible polyurethane foam according to claim 7 in which the chlorinated hydrocarbon polymer is a copolymer of vinyl chloride and vinylidene chloride.

References Cited

UNITED STATES PATENTS 3,574,149  4/1971  Harrington _____ 260—45.75 R
2,950,263  8/1960  Abbotson et al. ____ 260—2.5 AT

FOREIGN PATENTS 1,079,984  8/1967  Great Britain _____ 260—2.5 AJ

DONALD E. CZAJA, Primary Examiner

M. J. WELSH, Assistant Examiner

U.S. Cl. X.R.

260—2.5 BE, 2.5 AM, 2.5 AT